United States Patent [19]

Kuze et al.

[11] Patent Number: 5,349,042
[45] Date of Patent: Sep. 20, 1994

[54] PROCESS FOR PRODUCING POLYCARBONATE

[75] Inventors: Shigeki Kuze; Ryozo Okumura; Yoshinobu Suwabe, all of Ichihara, Japan

[73] Assignee: Idemitsu Petrochemical Co., Ltd., Tokyo, Japan

[21] Appl. No.: 31,828

[22] Filed: Mar. 16, 1993

[30] Foreign Application Priority Data

Mar. 17, 1992 [JP] Japan ................................ 4-060079

[51] Int. Cl.⁵ ........................ C08G 64/00; C08G 63/68
[52] U.S. Cl. ........................... 528/196; 528/171; 528/202; 528/370
[58] Field of Search ............... 528/196, 370, 171, 202

[56] References Cited

U.S. PATENT DOCUMENTS 5,026,817  6/1991  Sakashita et al. ................... 528/196

FOREIGN PATENT DOCUMENTS

0351168A3  1/1990  European Pat. Off. .
0360578    3/1990  European Pat. Off. .
0382250A3  8/1990  European Pat. Off. .
2175722    9/1990  Japan .

*Primary Examiner*—John Kight, III
*Assistant Examiner*—Terressa Mosley
*Attorney, Agent, or Firm*—Oblon, Spivak, McClelland, Maier & Neustadt

[57] ABSTRACT

There is disclosed a process for producing a polycarbonate which comprises reacting, by the melt method, (A) a dihydroxy compound with (B) a carbonic diester having a chloride contempt derived from chloroformate group of not more than a prescribed level. According to the above process, a polycarbonate which is excellent in transparency, tone of color, heat resistance and water resistance can be efficiently and economically produced.

13 Claims, No Drawings

PROCESS FOR PRODUCING POLYCARBONATE

BACKGROUND OF THE INVENTION

1. Field of the Invention

The present invention relates to a process for producing a polycarbonate, and more particularly to a process for efficiently producing a polycarbonate excellent in transparency, heat resistance, and water resistance.

2Description of the Related Arts

Generally, in order to produce a polycarbonate (hereinafter referred to as "PC"), there have been known the interfacial method as a method of directly reacting an aromatic dihydroxy compound such as bisphenol A with phosgene, and the melt method as a method of transesterifying an aromatic dihydroxy compound such as bisphenol A with a carbonic acid ester such as diphenyl carbonate both in a molten state.

However, the interfacial method has a problem in that a poisonous phosgene must be used, the production equipment is corroded by a chlorine-containing compound such as hydrochloric acid or sodium chloride which is by-produced in the reaction, and that impurities such as sodium hydroxide contaminating into the resin are difficult to separate. These impurities have ill effects on the physical properties of the polymer.

On the other hand, the melt method has an advantage of producing PC at a lower cost than in the interfacial method, but is involved in a serious disadvantage of ineviatble coloring of the resulting resin since the reaction usually continues for a long period of time at so high a temperature of 280° C. to 310° C.

To reduce the coloring in the melting method, various improvements have been proposed. Japanese Patent Publication No. 39972/1986 and Japanese Patent Application Laid-Open No. 223036/1988, for instance, disclose a method using a particular catalyst. Japanese Patent Application Laid-Open No. 151236/1986 and Japanese Patent Application Laid-Open No. 158719/1987 disclose methods wherein antioxidants are added in the latter stage of reaction. Moreover, Japanese Patent Application Laid-Open No. 62522/1986 and Japanese Patent Application Laid-Open No. 153925 disclose improvements in processes, that is, employment of a twin-screw vent-type kneading extruder, and horizontal stirred polymerization tank, respectively. Further, Japanese Patent Application Laid-Open No. 175722/1990 discloses a process for controlling the content of a hydrolyzable chlorine compound in the monomer under a prescribed level. Such problems, however, have not completely been dissolved, and a satisfactory PC has not been obtained yet.

Under these circumstances, the present inventors have made intensive research to improve transparency, tone of color, heat resistance and water reistance of PC and to develop a process for efficiently producing PC.

SUMMARY OF THE INVENTION

As the result, it has been found that the above problem can be overcome by using a carbonic diester containing less than the prescribed amount of chlorine ion derived from chloroformate, contained as an impurity, in the process for producing PC by transesterification. The present invention has been accomplished on the basis of such knowledge.

That is, the present invention provides a process for producing a polycarbonate which comprises transesterifying (A) a dihydroxy compound and (B) a carbonic diester with, as an impurity, a chlorine content derived from chloroformate group being under 30 ppm.

THE MOST PREFERRED EMBODIMENT TO CARRY OUT THE INVENTION

In the present invention, various dihydroxy compounds may be used as Component (A), including at least one compound selected from the group consisting of aromatic dihydroxy compounds, aliphatic dihydroxy compounds, bisesters of aromatic dihydroxy compounds, bisesters of aliphatic dihydroxy compounds, carbonates of aromatic dihydroxy compounds, and carbonates of aliphatic dihydroxy compounds.

First, the aromatic dihydroxy compounds used as Component (A) include, a compound represented by the general formula (I):

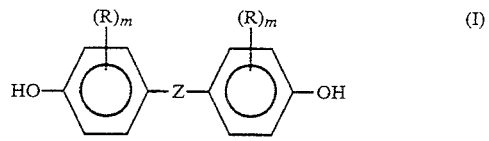

wherein, R is a hydrogen atom, a halogen atom such as chlorine, bromine, fluorine, and iodine or an alkyl group having 1 to 8 carbon atoms, and when R is plural, they may be the same or different, and m is a number of 0 to 4; Z indicates a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or —S—, —SO—, —SO$_2$—, —O—, —CO— bond or a bond represented by the general formula (II):

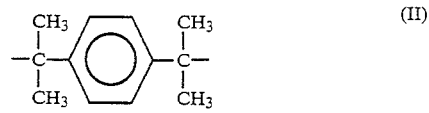

Specific examples of these compounds are bis(hydroxyaryl) alkanes such as bis(4-hydroxyphenyl)methane, 1,1-bis(4-hydroxyphenyl)ethane, 2,2-bis(4-hydroxyphenyl)propane (bisphenol A), 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 1,1-bis(4-hydroxytertiary-butylphenyl)propane, 2,2-bis(4-hydroxy-3-bromophenyl) propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl) cyclohexane, and 1,1-bis(4-hydroxyphenyl)-3,5,5-trimethylcyclohexane; dihydroxyaryl ethers such as 4,4-dihydroxydiphenyl ether, and 4,4'-dihydroxy-3,3'-dimethylphenyl ether; dihydoxydiaryl sulfides such as 4,4'-dihydroxydiphenyl sulfide; 4,4'-dihydroxy-3,3'-dimethyldiphenyl sulfide; dihydroxyaryl sulfoxides such as 4,4'-dihydroxydiphenyl sulfoxide, and 4,4'-dihydroxy-3,3'-dimethyldiphenyl sulfoxide; dihydroxydiaryl sulfones such as 4,4'-dihydroxydiphenyl sulfone, and 4,4'-dihydroxy-3,3'-dimethyldiphenyl sulfone; and dihydroxybenzene, halogen-substituted dihydroxybenzene such as 1,4-dihydroxy-2,5-dichlorobenzene, and alkyl-substituted dihydroxybenzene such as 1,4-dihydroxy-3-methylbenzene.

The aliphatic dihydroxy compounds, one of Component (A) include various ones. Examples of them are butane-1,4-diol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcylohexane, p-xylylene glycol, and 2,2-bis-(4-hydroxycyclohexyl)-propane. Further, ethoxylated products and propoxylated products of dihydric alcohols or dihydric phenols, for example, bis-oxyethyl-bisphenol A, bis-oxyethyl-tetrachlorobisphenol A or bis-oxyethyl-tetrachlorohydroquinone are also mentioned.

As the bisesters of aromatic dihydoxy compounds, bisesters of aliphatic dihydroxy compounds, carbonates of aromatic dihydroxy compounds or carbonates of aliphatic dihydroxy compounds which are used as component (A), examples of the bisesters of the above-mentioned compounds are compounds represented by the generalformula (III):

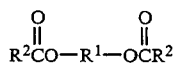
(III)

wherein $R^1$ indicates the residue of removing two hydroxyl groups from the above aliphatic dihydroxy compound, and $R^2$ indicates an alkyl group having 1 to 6 carbon atoms or a cycloalkyl group having 4 to 7 carbon atoms; compounds represented by the general formula (IV):

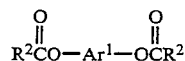
(IV)

wherein $Ar^1$ indicates the residue of removing two hydroxyl groups from the above-mentioned aromatic dihydroxy compound, and $R^2$ is as defined above; compounds represented by the general formula (V):

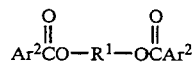
(V)

wherein $Ar^2$ indicates an aryl group, and $R^1$ is as defined above; and compounds represented by the general formula (VI):

(VI)

wherein $Ar^1$ and $Ar^2$ are as defined above.

Examples of carbonates of the above compounds are compoundsrepresented by the general formula (VII):

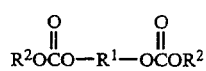
(VII)

wherein $R^1$ and $R^2$ are as defined above; compounds represented by the general formula (VIII):

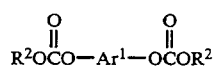
(VIII)

wherein $R^2$ and $Ar^1$ are as defined above; compounds represented by the general formula (IX)

(IX)

wherein $R^1$ and $Ar^2$ are as defined above; and compounds represented by the general formula (X):

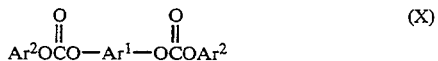
(X)

wherein $Ar^1$ and $Ar^2$ are as defined above.

In the present invention, as the dihydroxy compound as Component (A), appropriate one of the above-mentioned compounds is properly selected to be used.

On the other hand, carbonic diester used as component (B) in the present invention include various ones. An example of them is at least one compound selected from the group consisting of diaryl carbonates, dialkyl cabonates and alkylaryl carbonates.

First, preferred examples of diaryl carbonates used as Component (B) are compounds represented by the general formula (XI):

(XI)

wherein, $Ar^2$ is as defined above; or compounds represented by the general formula (X):

(X)

wherein $Ar^1$ and $Ar^2$ are as defined above; and preferred examples of dialkyl carbonates are compounds represented by the general formula (XII):

(XII)

wherein $R^2$ is as defined above; or compounds represented by the general formula (VIII):

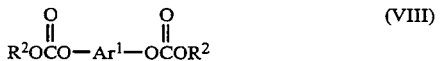
(VIII)

wherein $R^2$ and $Ar^1$ are as defined above; and preferred examples of alkylaryl carbonates are compounds represented by the general formula (XIII):

(XIII)

wherein $R^2$ and $Ar^2$ are as defined above; or compounds represented by the general formula (XIV):

(XIV)

wherein $R^2$, $Ar^1$ and $Ar^2$ are as defined above.

Specific examples of these diaryl carbonates are diphenyl carbonate, ditolyl carbonate, bis(chlorophenyl)

carbonate, m-cresyl carbonate, dinaphthyl carbonate, bis(diphenyl) carbonate, and bisphenol A-bisphenyl carbonate.

Specific examples of these dialkyl carbonates are diethyl carbonate, dimethyl carbonate, dibutyl carbonate, dicyclohexyl carbonate, and bisphenol A-bismethyl carbonate.

Specific examples of alkylaryl carbonates are methylphenyl carbonate, ethylphenyl carbonate, butylphenyl carbonate, cyclohexyl carbonate, and bisphenol A-methylphenyl carbonate. Among the above, diphenyl carbonate is particularly preferable.

As the carbonic diester as component (B), appropriate ones of the above-mentioned compounds are selected to be used. The process of the present invention employs particularly those carbonic diesters with, as an impurity, chlorine content derived from chloroformate group being not more than 30 ppm, preferably not more than 10 ppm. By the use of these carbonic diesters, a polycarbonate excellent in transparency and tone of color can be obtained.

Herein, as the impurity contained in the carbonic diester, chlorine content derived from chloroformate group is determined in the following manner.

First, 5 g of carbonic diester is dissolved into 50 ml of dioxane, and then the solution is decomposed with 50 mml of 5% solution of potassium hydroxide in methanol at room temperature, and the resulting chlorine content is determined by the use of a potentiometric titation apparatus (for example, COMTIME-7 manufactured by Hiranuma Industry), and the result is referred to as chlorine content A.

Subsequently, 5 g of carbonic diester is dissolved into 10 ml of toluene, 10 ml of an eluate (2.8 mM NaHCO$_3$2.25 mM Na$_2$CO$_3$) was added to the solution. Then, water is added thereto, and the mixture is stirred and extracted. The chlorine content in the extract is determined by the use of ion chromatography (for example, IC7000P manufactured by Yokogawa Electric Co., Ltd.), and the result is referred to as chlorine content B.

A value found by deducting chlorine content B from chlorine content A determined in the above-mentioned manner is referred to as chlorine content C.

On the other hand, as the result of analysis of carbonic diphenyl using GC-MS (GC:5880 produced by Hewlett Packard Ltd., MB:JMS-AX505H manufactured by JOEL Ltd.), almost the same amount of phenylchloroformate as chlorine content C was detected.

In the present invention, chlorine content C determined in the above manner was regarded as chlorine content derived from chloroformate group.

In order to purify carbonic diester to obtain a carbonic diester having, as an impurity, not more than 30 ppm of chlorine content derived from chloroformate group, a lower alcohol such as ethanol is used as recrystallization solvent, and recrystallizing purification is conducted in heat reflux for 20 minutes or more. Herein, if the heat reflux period is shorter than 20 minutes, chlorofomate is not sufficiently decomposed.

Further, carbonic diester can also be purified by a method in which a lower alcohol such as ethanol is used as recrystallization solvent, and recrystallizatioin purification is conducted in the coexistance of a tertiary amine in a trace amount (around 1.0 to 0.01 wt %) such as pyridine or triethylamine, and the resulting crystal is washed with a lower alcohol and pure water.

Otherwise, the purification can also be performed by dissolving carbonic diester into an organic solvent immiscible with water such as methylene chloride, washing with an aqueous alkali solution of pH 13 to 10, and then washing with acid and the organic phase is separated and concentrated, and the resulting carbonic diester can be recrystallized or vacuum-distilled.

In the process of the present invention, the abovementioned (A) and (B) are reacted, but these can be reacted also in an inactive solvent. The inactive solvent is used as a diluent for the purpose of lowering the viscosity of the reaction product.

Inactive solvent to be used herein can be appropriately selected depending on the conditions. Specific examples of them are aromatic compounds such as diphenyl ether, halogenated diphenyl ether, diphenyl sulfone, benzophenone, polyphenyl ether, dichlorobenzene, and methylnaphthalene; gases such as carbon dioxide, dinitrogen oxide, and nitrogen; alkanes such as ethane and propane; cycloalkanes such as cyclohexane, tricyclo(5,2,10)-decane, cyclooctane, and cyclododecane; alkenes such as ethene and propene;, and sulfur hexafluoride. As the inactive solvent to be used in the present invention, diphenylether is particularly preferred.

Further, in the present invention, terminal stoppers as shown below can be used though not particularly limited. Specific examples of these terminal stoppers are o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol represented by the formula:

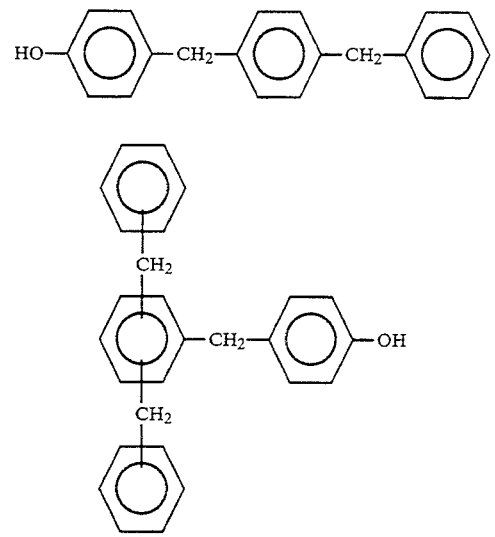

3,5-dicumylphenol, and chroman derivative such as the monohydric phenol represented by the formula:

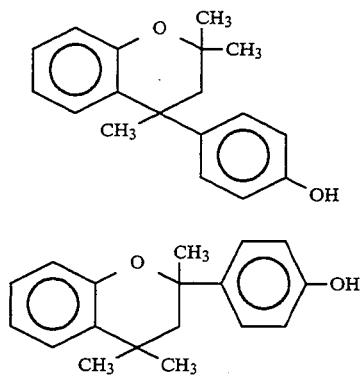

Of the above-mentioned phenols, though not particularly limited, p-t-buylphenol, p-cumylphenol, p-phenylphenol and the like are preferred in the present invention.

Other terminal stoppers are carbonic diester compounds to be used in some cases. Specific examples of these terminal stoppers of carbonic diester compounds are carbobutoxyphenylphenyl carbonate, methylphenylbutylphenyl carbonate, ethylphenylbutylphenyl carbonate, dibutyldiphenyl carbonate, biphenylphenyl carbonate, dibiphenyl carbonate, cumylphenylphenyl carbonate, dicumylphenyl carbonate, naphthylphenylphenyl carbonate, dinaphtylphenyl carbonate, carbopropoxyphenylphenyl carbonate, carbobutoxyphenylphenyl carbonate, carbomethoxy-t-butylphenylphenyl carbonate, carboprotoxyphenylmethylphenylphenyl carbonate, chromanylphenyl carbonate, and dichromanyl carbonate.

Further examples are compounds represented by the formula:

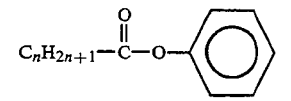

$C_nH_{2n+1}$—OH
(wherein n is an integer of 7 to 30)

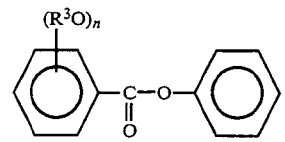

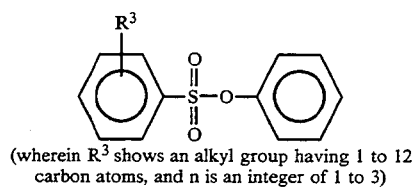

(wherein $R^3$ shows an alkyl group having 1 to 12 carbon atoms, and n is an integer of 1 to 3)

If the amount of terminal stopper such as monohydric phenol or carbonic diester compound as mentioned above is in the range of 0.05 mol % to 10 mol % based on 1 mol of dihydroxy compound as Component (A), the terminals of the hydroxyl groups of the resulting polycarbonate are sealed. Accordingly, a polycarbonate sufficiently excellent in heat resistance and water resistance is obtained.

Whole amount of these monohydric phenols or carbonic diester compounds may be added to reaction system in advance, or a part of them may be added to the reaction system in advance and the rest may be added as the reaction proceeds. Further, in some cases, whole amount of them may be added to the system after a partial progress of polycondensation reaction of the above-mentioned (A) dihydroxy compound and (B) carbonic compound.

Further, in the present invention, though not particularly limited, phloroglucine, trimellitic acid, 1,1,-tris(4-hydroxyphenyl)ethane, 1-[α-methyl-α-(4'-hydroxyphenyl)ethyl]-4-[α', α'-bis(4''-hydroxyphenyl)ethyl]-benzene, α, α', α''-tris(4-hydroxyphenyl)-1,3,5-triisopropylbenzene, isatinbis(o-crezol) and the like can be used as the branching agent.

In the present invention, a catalyst is not particularly required, but a conventional catalyst can be used to promote the transesterification reaction. Specific examples of the catalyst are single substance, oxide, hydroxide, amide compound, alcholato, phenolato off alkali metal or alkaline earth metals; basic oxides of metals such as ZnO, PbO and $Sb_2O_3$; organotitanium compounds, soluble manganese compounds; acetates of Ca, Mg, Zn, Pb, Sn, Mn, Cd, or Co. Further, catalysts in combination use of nitrogen-containing basic compound and boron compound; nitrogen-containing basic compound and alkali(me earth) metal compound; nitrogen-containing basic compound and alkali(me earth) metal compound and boron compound are also used.

In the process of the present invention, the reaction proceeds in accordance with the conventional transesterification process. The procedures and conditions of the process of the present invention are specifically described as follows:

As Component (A), dihydroxy compounds such as aromatic dihydroxy compounds, aliphatic dihydroxy compounds, and bisesters of aromatic dihydroxy compounds; carbonates of aromatic dihydroxy compounds; bisesters of aliphatic dihydroxy compounds; or carbonates of aliphatic dihydroxy compounds, as mentioned above, are used. As Component (B), carbonic compounds such as diaryl carbonates, dialkyl carbonates or alkylaryl carbonates are used. Components (A) and (B) should be compounded in such a ratio that the amount of carbonate be 1 to 1.5 times (mol) that of dihydroxy compound. Under some conditions, the amount of the carboxylic compound is preferred to be 1.02 to 1.20 times (mol) that of dihydroxy compound, that is a little excess of the stoichiometric amount.

The reaction temperature in the process is not specifically limited, but usually in the range of 100° C. to 330° C., and it is preferred to gradually raise the temperature to 180° C. to 300° C. according to the progress of the reaction. This reaction proceeds slowly under 100° C., while over 330° C. thermal deterioration of polymer is undesirably caused.

The pressure during the reaction is selected according to the reaction temperature as well as the vapor pressure of monomers to be used. It is not to be limited provided that the reaction pressure is selected so that the reaction is effected efficiently. Usually, in the initial stage of the reaction, the reaction proceeds at the atmospheric pressure or under a higher pressure, that is, under a pressure of 1 to 5 atm (760 to 38,000 torr), while in the latter stage of the reaction, the reaction is conducted under a reduced pressure, preferably 0.01 to 1.00 torr finally. The reaction is continued till the desired molecular weight is obtained, and the usual reaction period of time is 2 to 10 hours.

The above-mentioned reaction is carried out in the absence of an inactive solvent, but may be performed at need in the presence of an inactive solvent in an amount of 1 to 150% by weight based on the amount of PC.

In the present invention, as the reaction proceeds, phenols and alcohols corresponding to the carbonic compound used or esters thereof and inactive solvents are also released from the reactor. These products can be recycled through separation and purification, and it is preferable to install an equipment for recovering the aforesaid compounds.

The reaction in the present invention can be performed batchwise or continuously, and in any equipment. When the reaction is performed in continuous system, at least two reactors should be used to provide the above-described reaction conditions.

The structure of the reactor to be used in the present invention is not particularly limited, and those having usual stirring function may be employed. However, those provided with stirring function for high viscosity are preferred, since the viscosity rises in the latter stage of the reaction. The reactor is not limited to tank-type, but may also be an extruder-type.

In the process of the present invention, antioxidants can be used at need. Specific examples of them are phosphorus-based antioxidants such as tris(nonylphenyl)phosphite, trisphenylphosphite, 2-ethylhexyldiphenylphosphite, trimethylphosphite, triethylphosphite, tricredylphosphite, and triarylphosphite.

PC obtained according to the above process may be directly pelletized, or may be molded with extruder or the like.

PC obtained according to the present invention can be used with conventional additives such as plasticizer, pigment, lubricating agent, releasing agent, stabilizer, and inorganic filler.

Further, this PC can be blended with polymers such as polyester, polysulfonate, polyamide, and polyphenylene oxide.

As described above, according to the present invention, by the use of carbonic diester having, as an impurity, a chlorine content of not more than 30 ppm derived from the chloroformate group, PC excellent in transparency, tone of color, heat-resistance, and water-resistance can be efficiently produced.

In addition, since the transesterification method with simple process is employed, a production of PC at a low cost is realized.

Consequently, the present invention can be effectively and extensively utilized as a process for producing a high quality polycarbonate in an industrially advantageous manner.

The present invention is explained in greater detail with reference to Preparation Examples, Examples, and Comparative Exmples, provided that the present invention is not limited by the following examples.

Preparation Example 1 (Preparation of Diphenylcarbonate A)

To 3,000 g of a 20% aqueous solution of sodium hydroxide (15 mol of sodium hydroxide) were added 1,000 g (10.6 mol) of phenol, 10.7 g (0.106 mol) of triethylamine, and 5 L (L=liter) of methylene chloride and 660 g (6.7 mol) of phosgene was blown into the mixture to react. When the reaction was over, 100 ml of 30% hydrochloric acid was added to wash the mixture, and the organic phase was separated. Subsequently, after washing with 3.5 L of water, the organic phase was separated, and methylene chloride phase was removed to obtain crude diphenylcarbonate A, which was vacuum-distilled to obtain Diphenylcarbonate A. The chlorine content in Diphenylcarbonate A derived from chloroformate group was 3,000 ppm.

Preparation Example 2 (Preparation of Diphenylcarbonate B)

To 500 g of diphenylcarbonate A, 1 liter of ethanol was added and heated to dissolve. After dissolution, the solution was heat refluxed for 30 minutes, and heat filtered with filter paper, slowly cooled to room temperature, and crystal was precipitated out. Subsequently, the crystal was taken out, and sufficiently washed with ethanol to obtain Diphenylcarbonate B. The chlorine content in Diphenylcarbonate B derived from chloroformate group was 6 ppm.

Preparation Example 3 (Preparation of Diphenylcarbonate C)

The procedure of Preparation Example 2 was repeated to obtain Diphenylcarbonate C except that 0.5 g of pyridine was allowed to coexist. The chlorine content in Diphenylcarbonate C derived from chloroformate group was under 1 ppm.

Preparation Example 4 (Preparation of Diphenylcarbonate D)

500 g of Diphenylcarbonate A was dissolved into 3 L of methylene chloride, and 1L of O.01N aqueous solution of sodium hydroxide was added thereto to be shaken in a shaker for 20 minutes. Subsequently, the mixture was washed with 0.1N hydrochloric acid, and with water, and then washing with water was repeated until the electric conductivity of the aqueous phase finally reached 5 $\mu$s/cm. Then, the organic phase was separated, and methylene chloride was removed to obtain a diphenyl carbonate, which was recrystallized and purified in the same manner as in Preparation Example 2 to obtain Diphenylcarbonate D. The chlorine content in Diphenylcarbonate D derived from chloroformate group was under 1 ppm.

Preparation Example 5 (Preparation of Diphenylcarbonate E: The Same Method for Purification as that of Example 1 of Japanese Patent Application Laid-Open No. 175722/1990)

A diphenylcarbonate (produced by Bayer A.G.) having 5.9 ppm of hydrolyzable chlorine content was washed twice with warm water at 80° C. having pH of 7.0, and then vacuum-distilled to obtain Diphenylcarbonate E having not more than 0.1 ppm of hydrolyzable chlorine content in a recovery of 90%. The chlorine content in Diphenylcarbonate E derived from chloroformate group was 45 ppm.

EXAMPLE 1

In a 1.4 L nickel-steel autoclave (equipped with a stirrer), 228 g (1 mol) of bisphenol, and 257 g (1.2 mol) of Diphenylcarbonate B were placed to be subjected to nitrogen substitution 5 times. The resulting mixture was heated to 180° C. to melt bisphenol A and Diphenylcarbonate B. Subsequently, 2.5 mg ($1 \times 10^{-5}$ mol) of $(C_4H_9)_4NBH_4$ was added as the catalyst, and the mixture was heated to a temperature of 220° C., and simultaneously, stirring was started and a trace amount of nitrogen was passed. Then phenol began to be distilled away. After that, the reactant was kept at 220° C. for 4 hours.

Subsequently, the temperature was gradually raised from 220° C. to 280° C. over a perid of 1 hour, while the vacuum degree was raised to remove away the residual diphenylcarbonate and to promote transesterification. Finally with the pressure being 0.5 torr, the mixture was reacted for 1 hour under stirring, and lastly, PC as a viscous and transparent polycondensate was left. The PC was dissolved into methylene chloride, and determined for the viscosity average molecular weight to find a vlue of 22,000.

The resulting viscous and transparent PC was pulverized and pelletized with an extruder at 220° to 270° C. The pellet was injection molded, and the molding was subjected to YI evaluation, Thermal Deterioration Test, and Steam Resistance Test. The result is shown in Table 1.

EXAMPLE 2

The procedure of Example 1 was repeated except that Diphenylcarbonate C was used. The result is shown in Table 1.

EXAMPLE 3

The procedure of Example 1 was repeated except that Diphenylcarbonate D was used. The result is shown in Table 1.

Comparative Example 1

The procedure of Example 1 was repeated except that Diphenylcarbonate A was used. The result is shown in Table 1.

Comparative Example 2

The procedure of Example 1 was repeated except that Diphenylcarbonate E was used. The result is shown in Table 1.

EXAMPLE 4

The procedure of Example 1 was repeated except that 6.8 g (0.05 mol based on bisphenol A) of p-cumylphenol was initially placed as terminal stopper. The result is shown in Table 1.

EXAMPLE 5

The procedure of Example 1 was repeated except that 28.2 g of diphenyl ether was added as an inactive solvent and no catalyst was used. The result is shown in Table 1.

Preparation Example 6 (Preparation of Dimethylcarbonate A)

To 10 L of methylene chloride, 320 g (10 mol) of methanol, and 948 g (12 mol) of pyridine were added, and 480 g (4.8 mol) of phosgene was blown thereinto to be reacted. When the reaction was over, the reactant was washed with 5 L of 0.1N hydrochloric acid to separate the organic phase. Subsequently, after washing with water, the organic phase was separated out, and methylene chloride phase was removed to obtain a dimethylcarbonate, which was vacuum distilled to obtain Dimethylcarbonate A. Chlorine content in Dimethylcarbonate A, derived from chloroformate group was 2,800 ppm.

Preparation Example 7 (Preparation of Dimethylcarbonate B)

100 g of Dimethylcarbonate B was dissolved into 1 L of methylene chloride, and 1 L of 0.1N aqueous solution of sodium hydroxide was added thereto, and the mixture was shaken in a shaker for 20 minutes. This operation was conducted two times. Then, the mixture was washed with 0.2N hydrochloric acid and with water, and washing with water was repeated until the electric conductivity of the aqueous phase finally reached 5 µs/cm. Subsequently, the organic phase was separated out, and methylene chloride was removed to obtain a dimethyl carbonate. The dimethylcarbonate was vacuum distilled to obtain Dimethylcarbonate B. The chlorine content in Dimethylcarbonate B, derived from chloroformate group was under 1 ppm.

EXAMPLE 6

In an autoclave equipped with a distillation apparatus, 228 g (1 mol) of bisphenol A, 157 (1.7 mol) of Dimethylcarbonate B, and 0.27 g (0.05 mol) of KBH4 were placed and subjected to nitrogen substitution by pressurizing-depressurizing operation. Then, the reaction temperature was raised to 180 ° C., and the reaction was conducted for l hour at a pressure of 8 kg/cm$^2$ under stirring. In this reaction, the resulting methanol and excess dimethylcarbonate were distilled away.

Subsequently, the resulting oligomer was placed in a round bottom reactor at atmospheric pressure, and gradually heated to 240° to 250° C. while the pressure was reduced. About 3 hours later, the reactant was heated to 280° C. at a pressure of about 1 mmHg finally, and treated for 15 minutes. As methnaol was removed away, the solution became viscous. As the result of determination, the viscosity average molecular weight of the resulting polymer corresponded to 20,000.

The resulting viscous and transparent condensation was pulverized, and pelletized at 220° to 270° C. in an extruder. The pellet was injection molded, and the molding was subjected to YI evaluation, Thermal Deterioration Test, and Steam Resistance Test. The result is shown in Table 1.

Comparative Example 3

The procedure of Example 6 was repeated except that Dimethylcarbonate A was used. The result is shown in Table 1.

TABLE 1

| | Chlorine content derived from Chloroformate group*[1] (ppm) | Viscosity average molecular weight |
|---|---|---|
| Example 1 | 6 | 22,000 |
| Example 2 | 1> | 22,000 |
| Example 3 | 1> | 22,000 |
| Comparative Example 1 | 3,000 | 21,000 |
| Comparative Example 2 | 45 | 21,000 |
| Example 4 | 1> | 20,500 |
| Example 5 | 1> | 21,000 |
| Example 6 | 1> | 18,000 |
| Comparative Example 3 | 2,800 | 16,000 |

| | YI | Thermal deterioration test (ΔYI) | Steam resistance test |
|---|---|---|---|
| Example 1 | 3.5 | 3.8 | Transparent |
| Example 2 | 3.2 | 3.0 | Transparent |
| Example 3 | 3.1 | 3.0 | Transparent |
| Comparative | 29.0 | 20.5 | Milky |

TABLE 1-continued

| | | | |
|---|---|---|---|
| Example 1 | | | |
| Comparative Example 2 | 9.2 | 17.0 | Slightly milky |
| Example 4 | 2.5 | 2.8 | Transparent |
| Example 5 | 1.8 | 2.5 | Transparent |
| Example 6 | 4.0 | 4.0 | Transparent |
| Comparative Example 3 | 21.0 | 35.5 | Milky |

*[1] In carbonic diester

The conditions for the above-mentioned physical properties test are shown as follows.

1) YI

Determined in accordance with JIB K7103-77.

Determined by the use of Color Meter SM-3 manufactured by Instrument Co., Ltd.

2) Thermal Deterioration Test

Shown by the difference ($\Delta$YI) between YI of the molding molded at 320° C. and YI of the molding product molded after staying in the cylinder for 20 minutes.

3) Steam Resistance Test

After a plate 3 mm in thickness was exposed to steam at 120° C. for 48 hours, the state of the plate was judged visually.

What is claimed is:

1. A process for producing a polycarbonate, which comprises transesterifying (A) a dihydroxy compound and (B) a carbonic acid diester having, as an impurity, a chlorine content derived from chloroformate group of at most 30 ppm, which is obtained by subtracting the chlorine content extracted with water using ion chromatography from the total chlorine content contained in said carbonic acid diester determined by potentiometric titration.

2. The process according to claim 1, wherein the dihydroxy compound has the formula:

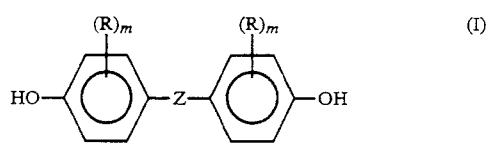

wherein R is a hydrogen atom, a halogen atom or an alkyl group having 1 to 8 carbon atoms, and when R is plural, each R is the same or different, and m is a number of 0 to 4; Z is a single bond or is an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or —S—, —SO—, —SO$_2$—, —O—, —CO— or a linking group of the formula:

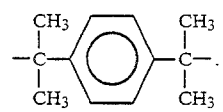

3. The process according to claim 1, wherein the dihydroxy compound is selected from the group consisting of aromatic dihydroxy compounds and aliphatic dihydroxy compounds.

4. The process according to claim 1, wherein the carbonic diester is selected from the group consisting of diaryl carbonates, dialkyl carbonates and alkylaryl carbonates.

5. The process according to claim 1, wherein the chlorine content of the carbonic diester is at most 10 ppm.

6. The process according to claim 3, wherein said dihydroxy compound is selected from the group consisting of butane-1, 4-diol, 2,2-dimethylpropane-1, 3-diol, hexane-1, 6-diol, diethylene glycol, triethylene glycol, tetraethylene glycol, octaethylene glycol, dipropylene glycol, N, N-methyldiethanolamine, cyclohexane-1, 3-diol, cyclohexane-1, 4-diol, 1, 4-dimethylolcyclohexane, p-xylylene glycol and 2, 2-bis(4-hydroxycyclohexyl)-propane, bis-oxyethyl-bisphenol A, bis-oxyethyl-tetrachlorobisphenol A and bis-oxyethyl-tetrachlorohydroquinone.

7. The process according to claim 4, wherein said diaryl carbonate is selected from the group consisting of diphenyl carbonate, ditolyl carbonate, bis (chlorophenyl) carbonate, m-cresyl carbonate, dinaphthyl carbonate, bis(diphenyl) carbonate and bisphenol A-bisphenol carbonate.

8. The process according to claim 4, wherein said dialkyl carbonate is selected from the group consisting of diethyl carbonate, dimethyl carbonate, dibutyl carbonate, dicyclohexyl carbonate and bisphenol A-bismethyl carbonate.

9. The process according to claim 4, wherein said alkylaryl carbonate is selected from the group consisting of methylphenyl carbonate, ethylphenyl carbonate, butylphenyl carbonate, cyclohexyl carbonate, diphenyl carbonate and bisphenol A-methylphenyl carbonate.

10. The process according to claim 1, wherein said dihydroxy compound (A) and said carbonic diester (B) are in a ratio such that the amount of (B) is from 1 to 1.5 moles per mole of (A).

11. The process according to claim 1, which is conducted at a temperature in the range of from 100° to 330° C.

12. The process according to claim 11, which is at a temperature in the range of from 180° to 300° C.

13. The process according to claim 1, wherein a first portion is at a pressure of 760 to 38,000 torr and a remaining portion thereof is at a pressure of 0.01 to 1.00 torr.

* * * * *